United States Patent
Amano et al.

(10) Patent No.: US 10,160,460 B2
(45) Date of Patent: Dec. 25, 2018

(54) FAILURE DETERMINING DEVICE OF HYBRID VEHICLE AND FAILURE DETERMINING METHOD THEREFOR

(71) Applicants: JATCO LTD, Fuji-shi, Shizuoka (JP); NISSAN MOTOR CO., LTD., Yokohama-shi, Kanagawa (JP)

(72) Inventors: Norihira Amano, Fuji (JP); Hajime Tasaka, Shizuoka (JP)

(73) Assignees: JATCO LTD, Fuji-shi (JP); NISSAN MOTOR CO., LTD., Yokohama-shi (JP)

( * ) Notice: Subject to any disclaimer, the term of this patent is extended or adjusted under 35 U.S.C. 154(b) by 98 days.

(21) Appl. No.: 14/778,203

(22) PCT Filed: Mar. 20, 2014

(86) PCT No.: PCT/JP2014/057697
§ 371 (c)(1),
(2) Date: Sep. 18, 2015

(87) PCT Pub. No.: WO2014/156931
PCT Pub. Date: Oct. 2, 2014

(65) Prior Publication Data
US 2016/0280232 A1 Sep. 29, 2016

(30) Foreign Application Priority Data
Mar. 25, 2013 (JP) .................... 2013-062525

(51) Int. Cl.
*B60W 50/04* (2006.01)
*B60K 6/48* (2007.10)
(Continued)

(52) U.S. Cl.
CPC .......... *B60W 50/045* (2013.01); *B60K 6/48* (2013.01); *B60K 6/543* (2013.01); *B60L 3/0061* (2013.01);
(Continued)

(58) Field of Classification Search
CPC combination set(s) only.
See application file for complete search history.

(56) References Cited

U.S. PATENT DOCUMENTS 5,613,583 A * 3/1997 Kono ................. F16H 61/143
192/3.31
5,851,164 A * 12/1998 Habuchi ............... F16H 61/12
477/127
(Continued)

FOREIGN PATENT DOCUMENTS

JP 2010-149652 A 7/2010
JP 2010-155590 A 7/2010
(Continued)

*Primary Examiner* — Adam D Tissot
*Assistant Examiner* — Edward J Pipala
(74) *Attorney, Agent, or Firm* — Foley & Lardner LLP

(57) ABSTRACT

The integrated controller determines whether or not, regardless of execution of the WSC control, a rotation speed of the motor generator falls to less than an idle rotation speed and also whether or not differential rotation of the second clutch becomes less than a predetermined value, and determines that, if the determination is positive, a continuous MAX pressure failure has occurred in the second clutch.

5 Claims, 5 Drawing Sheets

(51) Int. Cl.

| | |
|---|---|
| *B60K 6/543* | (2007.10) |
| *B60L 11/14* | (2006.01) |
| *B60W 10/02* | (2006.01) |
| *B60W 30/18* | (2012.01) |
| *B60W 20/50* | (2016.01) |
| *B60L 3/00* | (2006.01) |
| *B60L 11/18* | (2006.01) |
| *B60L 15/20* | (2006.01) |
| *B60L 3/12* | (2006.01) |
| *F16D 48/06* | (2006.01) |

(52) U.S. Cl.
CPC .............. *B60L 3/12* (2013.01); *B60L 11/14* (2013.01); *B60L 11/18* (2013.01); *B60L 11/1861* (2013.01); *B60L 15/2054* (2013.01); *B60W 10/02* (2013.01); *B60W 20/50* (2013.01); *B60W 30/18027* (2013.01); *F16D 48/066* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/507* (2013.01); *B60Y 2300/429* (2013.01); *F16D 2500/1066* (2013.01); *F16D 2500/3024* (2013.01); *F16D 2500/3067* (2013.01); *F16D 2500/30408* (2013.01); *F16D 2500/3166* (2013.01); *F16D 2500/511* (2013.01); *F16D 2500/5108* (2013.01); *Y02T 10/6221* (2013.01); *Y02T 10/645* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/7241* (2013.01); *Y02T 10/7275* (2013.01)

(56) References Cited

U.S. PATENT DOCUMENTS

| | | | |
|---|---|---|---|
| 5,921,885 A * | 7/1999 | Tabata | F16H 61/12 |
| | | | 477/107 |
| 5,934,880 A * | 8/1999 | Yamada | B60T 13/148 |
| | | | 303/10 |
| 2013/0191012 A1 | 7/2013 | Hirotsu et al. | |

FOREIGN PATENT DOCUMENTS

| | | |
|---|---|---|
| JP | 2012-086652 A | 5/2012 |
| JP | 2013-151175 A | 8/2013 |
| WO | WO-2012/057130 A1 | 5/2012 |

* cited by examiner

FAILURE DETERMINING DEVICE OF HYBRID VEHICLE AND FAILURE DETERMINING METHOD THEREFOR

TECHNICAL FIELD

The present invention relates to a technology for determining a continuous MAX pressure failure in which a discharge pressure of an oil pump is supplied to a clutch as it is in a hybrid vehicle.

BACKGROUND ART

JP2010-155590A discloses a hybrid vehicle in which an engine and a motor are arranged in series, a first clutch is arranged between the engine and the motor, and a second clutch is arranged between the motor and driving wheels.

In a hybrid vehicle with a configuration as above, by disengaging the first clutch and engaging the second clutch, running enters an EV mode only on the motor, while by engaging the first clutch and the second clutch, the running enters an HEV mode on the engine and the motor.

Moreover, by executing WSC (Wet Start Clutch) control in which the second clutch is made to slip at start or at deceleration to stop, smooth start and stop are realized without relying on a torque converter.

SUMMARY OF INVENTION

A hydraulic pressure supplied to the above-described second clutch is controlled by a hydraulic control valve unit using a discharge pressure of the oil pump operated by transmission of rotation of the motor as a source pressure.

However, if the hydraulic control valve unit malfunctions (malfunction of a solenoid valve for controlling a hydraulic pressure supplied to the second clutch, for example) and a continuous MAX pressure failure in which the discharge pressure of the oil pump is supplied to the second clutch as it is occurs, the capacity of the second clutch causes hunting in the above-described WSC control. A mechanism that the second clutch causes hunting is as follows.

For example, if the continuous MAX failure has occurred at start, the discharge pressure of the oil pump is supplied to the second clutch as it is, and the start is performed in a state in which the capacity of the second clutch is large.

However, if the capacity of the second clutch is large, a load is applied to the motor from the driving wheels, and thus, rotation of the motor falls, while the discharge pressure of the oil pump lowers, which results in a decrease of the capacity of the second clutch.

As the capacity of the second clutch is decreasing, the second clutch slips and the motor is released from the driving wheels, but in such a state, the rotation of the motor rises, and the discharge pressure of the oil pump rises. Therefore, the capacity of the second clutch turns to increase.

As described above, if the capacity of the second clutch increases, the capacity turns to decrease after that, while if the capacity of the second clutch decreases, the capacity turns to increase after that and thus, the capacity of the second clutch causes hunting. When the WSC control is executed at deceleration to stop, too, the capacity of the second clutch causes hunting with the similar mechanism.

If the capacity of the second clutch causes hunting, an pressure value controlled by the hydraulic control valve unit causes hunting and thus, the capacity of the second clutch increases/decreases, and the second clutch no longer functions normally.

Regarding a start clutch not involved with the WSC control, a technology for detecting normal or failure on the basis of time from when the clutch is disengaged at selection to when it is engaged is generally used. That is, in the case of the MAX pressure failure, the time from a state of disengagement of the clutch to a state of engagement becomes shorter, a failure can be detected.

The failure detection can be made at selection similarly in the start clutch involved with the WSC control, but if detection of the failure is delayed, deterioration in running performances such as a shift quality, engine stall and the like is incurred, and there is a demand for early detection of a failure in a running state before selection.

An object of the present invention is to enable determination of the continuous MAX pressure failure in which the discharge pressure of the oil pump is supplied to the clutch as it is and to sufficiently ensure a chance for failure determination.

According to an aspect of the present invention, a failure determining device of a hybrid vehicle is provided. The hybrid vehicle includes an engine and a motor arranged in series, a clutch arranged between the motor and a driving wheel, an oil pump operating by transmission of rotation of the motor, and a pressure control mechanism for controlling a hydraulic pressure supplied to the clutch using a discharge pressure of the oil pump as a source pressure, in which WSC control for controlling the hydraulic pressure supplied to the clutch to a hydraulic pressure at which the clutch is made to slip by the pressure control mechanism at start or deceleration to stop. The failure determining device includes motor rotation drop determining means adapted to determine whether or not, regardless of execution of the WSC control, a rotation speed of the motor falls to less than an idle rotation speed and also whether or not differential rotation of the clutch becomes less than a predetermined value, and continuous MAX pressure failure determining means adapted to determine that, if the determination is positive, a continuous MAX pressure failure has occurred in which the discharge pressure of the oil pump is supplied to the clutch as it is.

A corresponding failure determining method for a hybrid vehicle is also provided.

According to these aspects, the continuous MAX pressure failure in which the discharge pressure of the oil pump is supplied to the clutch as it is can be determined. Moreover, since the failure determination is made at start or deceleration to stop, a chance for the determination failure can be sufficiently ensured.

DESCRIPTION OF EMBODIMENTS

An embodiment of the present invention will be described below by referring to the attached drawings.

Figure 1:
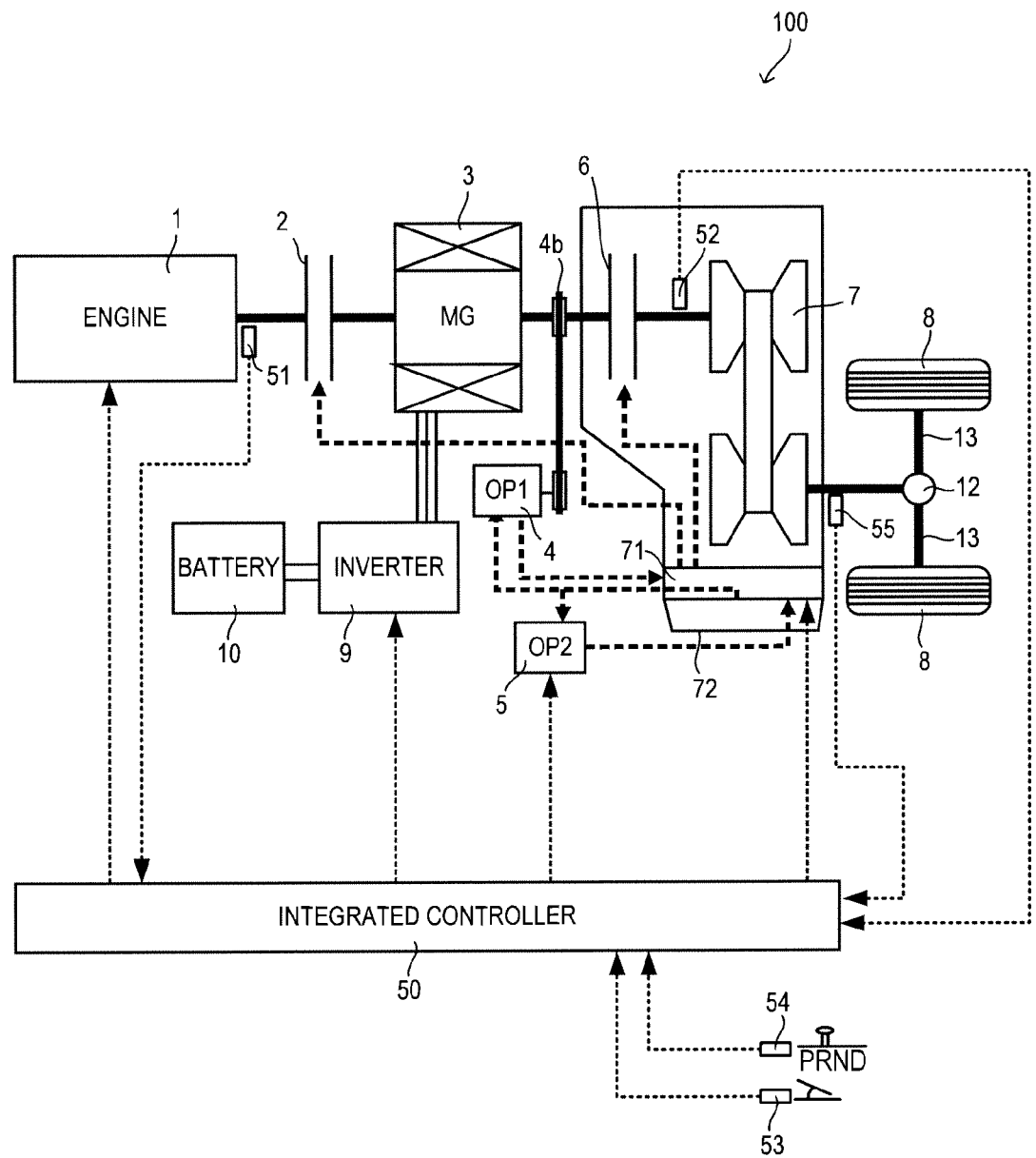
FIG. 1 is an entire configuration view of a hybrid vehicle to which a failure determining device according to an embodiment of the present invention is applied.

FIG. 1 is an entire configuration diagram of a hybrid vehicle (hereinafter referred to as a vehicle) 100. The vehicle 100 includes an engine 1, a first clutch 2, a motor generator (hereinafter referred to as an MG) 3, a first oil pump 4, a second oil pump 5, a second clutch 6, a continuously variable transmission (hereinafter referred to as a CVT) 7, driving wheels 8, and an integrated controller 50.

The engine 1 is an internal combustion engine using gasoline, diesel fuel or the like as a fuel, and a rotation speed, a torque and the like are controlled on the basis of an instruction from the integrated controller 50.

The first clutch 2 is a normally-open hydraulic clutch interposed between the engine 1 and the MG 3. The first clutch 2 has its engaged/disengaged state controlled by a hydraulic pressure controlled by a hydraulic control valve unit 71 using a discharge pressure of the first oil pump 4 or the second oil pump 5 as the source pressure on the basis of the instruction from the integrated controller 50. As the first clutch 2, a dry multi-plate clutch is used, for example.

The MG 3 is a synchronous rotary electric machine arranged in series to the engine 1 and in which a permanent magnet is embedded in a rotor and a stator coil is wound around a stator. The MG 3 is controlled by applying a three-phase AC created by an inverter 9 on the basis of the instruction from the integrated controller 50. The MG 3 can operate as an electric motor rotating by receiving supply of electricity from a battery 10. Moreover, the MG 3 functions as a power generator for generating an electromotive force on both ends of the stator coil when the rotor receives rotation energy from the engine 1 or the driving wheels 8 and can charge the battery 10.

The first oil pump 4 is a vane pump operating by transmission of rotation of the MG 3 through a belt 4b. The first oil pump 4 pumps up an operating oil stored in an oil pan 72 of the CVT 7 and supplies a hydraulic pressure to the hydraulic control valve unit 71.

The second oil pump 5 is an electric oil pump operating by receiving supply of the electricity from the battery 10. The second oil pump 5 is driven when an oil amount is insufficient only by the first oil pump 4 and pumps up the operating oil stored in an oil pan 72 of the CVT 7 similarly to the first oil pump 4 and supplies the hydraulic pressure to the hydraulic control valve unit 71 on the basis of the instruction from the integrated controller 50.

The second clutch 6 is interposed between the MG 3 as well as the CVT 7 and the driving wheels 8. The second clutch has its engagement/disengagement controlled by the hydraulic pressure controlled by the hydraulic control valve unit 71 using the discharge pressure of the first oil pump 4 or the second oil pump 5 as the source pressure on the basis of the instruction from the integrated controller 50. As the second clutch 6, a normally-open wet multi-plate clutch is used, for example.

The CVT 7 is arranged on downstream of the MG 3 and can continuously change a speed ratio in accordance with a vehicle speed, an accelerator opening degree or the like. The CVT 7 includes a primary pulley, a secondary pulley, and a belt extended between the both pulleys. By preparing a primary pulley pressure and a secondary pulley pressure by the hydraulic control valve unit 71 using the discharge pressures from the first oil pump 4 and the second oil pump 5 as the source pressures, moving a movable pulley of the primary pulley and a movable pulley of the secondary pulley in an axial direction by the pulley pressures and changing a pulley contact radius of the belt, the speed ratio can be changed continuously.

A differential 12 is connected to an output shaft of the CVT 7 through a final reduction gear mechanism, not shown, and the driving wheels 8 are connected to the differential 12 through drive shafts 13.

Into the integrated controller 50, signals from a rotation speed sensor 51 for detecting a rotation speed of the engine 1, a rotation speed sensor 52 for detecting an output rotation speed of the second clutch 6 (=input rotation speed of the CVT 7), an accelerator opening-degree sensor 53 for detecting an accelerator opening degree, an inhibitor switch 54 for detecting a select position of the CVT 7 (a state of a select lever or a select switch for switching among forward, reverse, neutral, and parking), a vehicle speed sensor 55 for detecting a vehicle speed and the like are inputted. The integrated controller 50 executes various types of control to the engine 1, the MG 3 (inverter 9), and the CVT 7 on the basis of these inputted signals.

Figure 2:
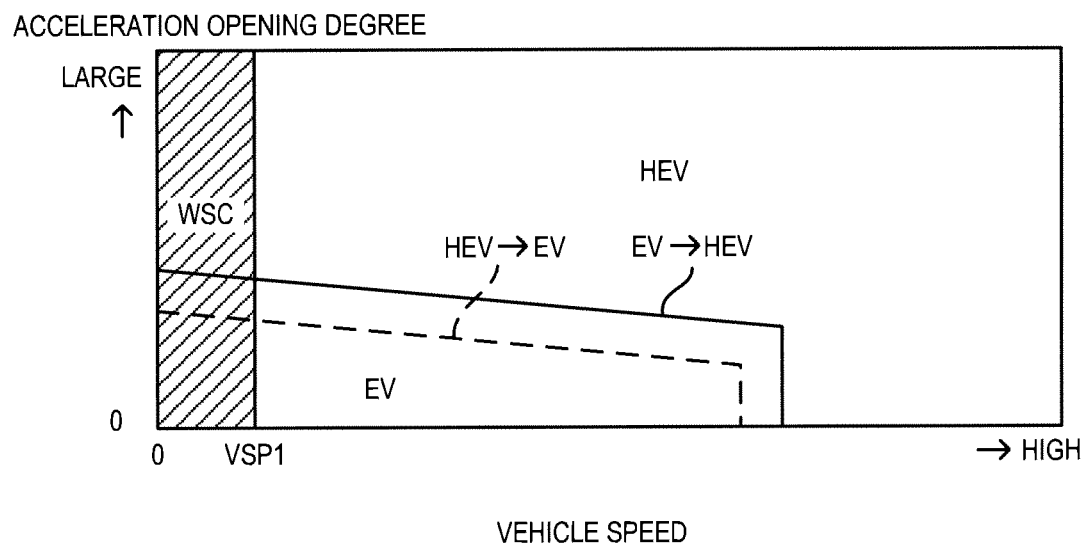
FIG. 2 is an example of a mode switching map.

Moreover, the integrated controller 50 switches an operation mode of the vehicle 100 between an EV mode and an HEV mode by referring to a mode switching map illustrated in FIG. 2.

The EV mode is a mode of running only with the MG 3 as a driving source while the first clutch 2 is disengaged. The EV mode is selected when a required driving force is low and a charged amount of the battery 10 is sufficient.

The HEV mode is a mode for running with the engine 1 and the MG 3 as the driving source while the first clutch 2 is engaged. The HEV mode is selected when the required driving force is high or the charged amount of the battery 10 is insufficient.

A switching line from the EV mode to the HEV mode is set on a higher vehicle speed side and on a larger accelerator opening degree side than the switching line from the HEV mode to the EV mode so that switching between the EV mode and the HEV mode does not cause hunting.

Moreover, since the vehicle 100 is not provided with a torque converter, the integrated controller 50 executes the WSC control of starting and stopping while allowing the second clutch 6 to slip in a WSC region (a low vehicle-speed region with a vehicle speed used at start/deceleration to stop at VSP1 or less, and VSP1 is 10 km/h, for example) illustrated in FIG. 2.

Specifically, when the select position of the CVT 7 is switched from a non-running position (N, P and the like) to a running position (D, R and the like) and the vehicle 100 is to start, the integrated controller 50 gradually increases a hydraulic pressure supplied to the second clutch 6 and gradually engages the second clutch 6 while allowing it to slip. Then, when the vehicle speed reaches the VSP1, the integrated controller 50 fully engages the second clutch 6 and finishes the WSC control.

Moreover, if the vehicle 100 is running with the select position of the CVT 7 at the running position (D, R and the like) and the vehicle 100 decelerates and the vehicle speed lowers to VSP1, the integrated controller 50 gradually lowers the hydraulic pressure supplied to the second clutch 6 and gradually disengages it while allowing the second clutch 6 to slip. Then, when the vehicle 100 is stopped, the integrated controller 50 fully disengages the second clutch 6 and finishes the WSC control.

As described above, the WSC control is to finely control the hydraulic pressure supplied to the second clutch 6 so that the second clutch 6 slips, and the hydraulic control valve unit 71 needs to function normally.

Thus, if malfunction of the hydraulic control valve unit 71 (malfunction of the solenoid valve for controlling the hydraulic pressure supplied to the second clutch 6, for example) occurs, and the continuous MAX pressure failure in which the discharge pressure of the first oil pump 4 is supplied to the second clutch 6 as it is occurs, as described in SUMMARY OF INVENTION, the capacity of the second clutch 6 causes hunting.

Thus, the integrated controller 50 executes the failure determination processing described below and determines whether or not the continuous MAX pressure failure occurs in the second clutch 6.

Figure 3:
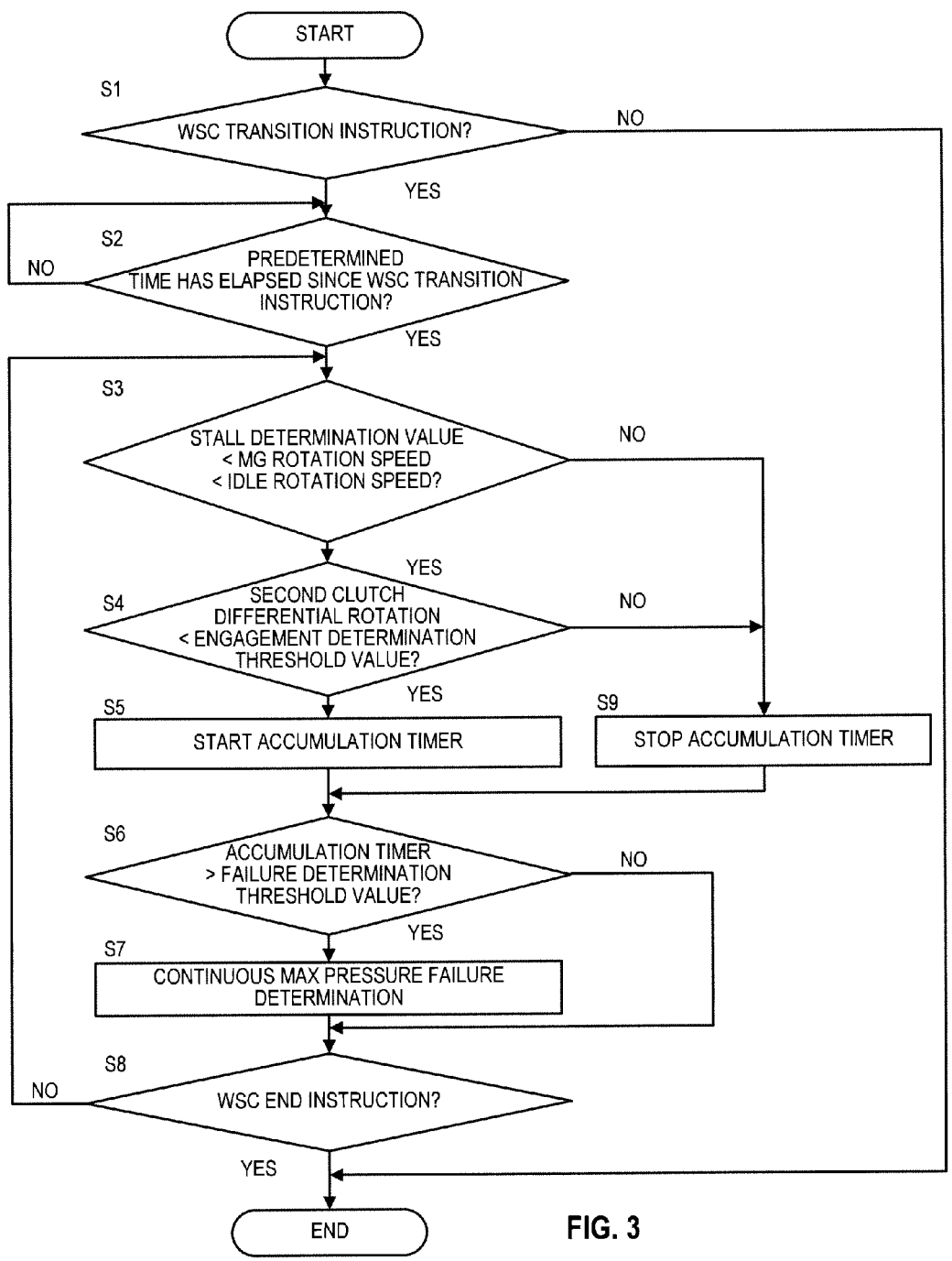
FIG. 3 is a flowchart illustrating contents of failure determination processing.

FIG. 3 is a flowchart illustrating the contents of the failure determination processing executed by the integrated controller 50. By referring to that, the failure determination processing executed by the integrated controller 50 will be described.

First, at S1, the integrated controller 50 determines whether or not a WSC transition instruction has been issued. If it is determined that the WSC transition instruction has been issued, processing proceeds to S2.

The WSC transition instruction is issued when the select position is switched from the non-running position to the running position (at start) or when the vehicle 100 decelerates during running at the running position and the vehicle speed lowers to VSP1 (at deceleration to stop).

When the WSC transition instruction is issued, the integrated controller 50 gives an instruction to the hydraulic control valve unit 71 so that the hydraulic pressure supplied to the second clutch 6 is gradually increased if it is at start, while the hydraulic pressure supplied to the second clutch 6 is gradually decreased if it is at deceleration to stop, whereby the second clutch 6 is controlled into a slip state.

At S2, the integrated controller 50 determines whether or not predetermined time has elapsed since the WSC transition instruction. If it is determined that the predetermined time has elapsed since the WSC transition instruction, the processing proceeds to S3.

This is the processing for preventing processing to proceed to S3 before a state actually enters the WSC state since there is a delay until the state actually enters the WSC state after the WSC transition instruction is issued. The delay until the state actually enters the WSC state after issuance of the WSC transition instruction depends on an oil temperature (viscosity of the operating oil), and the lower the oil temperature is, the larger the delay becomes and thus, the lower the oil temperature is, the longer the predetermined time is set.

At S3, the integrated controller 50 determines whether or not the rotation speed of the MG 3 is higher than a stall determination value and lower than an idle rotation speed. The stall determination value is a threshold value for determining whether or not the engine 1 stalls. The idle rotation speed is a target rotation speed of the MG 3 in a state in which an accelerator pedal is not stepped on.

If it is determined that the rotation speed of the MG 3 is higher than the stall determination value and lower than the idle rotation speed, the processing proceeds to S4.

At S4, the integrated controller 50 determines whether or not differential rotation of the second clutch 6, that is, an absolute value of differential rotation which is a difference between an input-side rotation speed (=rotation speed of MG 3) and an output-side rotation speed is less than an engagement determination threshold value. The engagement determination threshold value is a threshold value for determining that the second clutch 6 is fully engaged or in a state close to full engagement.

If it is determined that the differential rotation of the second clutch 6 is less than the engagement determination threshold value, the processing proceeds to S5.

When the processing proceeds to S5, positive determination was made at S3 and S4, the engine 1 does not stall, the rotation of the MG 3 has fallen to less than the idle rotation speed, and the second clutch 6 is fully engaged or in the state close to the full engagement and thus, it is likely that the continuous MAX pressure failure in which the discharge pressure of the first oil pump 4 is supplied to the second clutch 6 as it is occurs. Thus, at S5, the integrated controller 50 starts an accumulation timer so as to acquire an accumulated value of time determined that the continuous MAX pressure failure is likely to occur in the second clutch 6.

Then, at S6, the integrated controller 50 determines whether or not a value of the accumulation timer is larger than the failure determination threshold value. If the value of the accumulation timer is determined to be larger than the failure determination threshold value, the processing proceeds to S7.

The accumulation timer is reset to 0 at timing when an ignition key is turned off or on. Therefore, whether or not the continuous MAX pressure failure occurs in the second clutch 6 is determined on the basis of the value of the accumulation timer in 1 trip.

At S7, the integrated controller 50 determines that the continuous MAX pressure failure occurs in the second clutch 6.

At S8, the integrated controller 50 determines whether or not the WSC end instruction has been issued. If it is determined that the WSC end instruction has been issued, the processing is finished, while if it is determined that the WSC end instruction has not been issued, the processing returns to S3, and the processing at S3 to S9 is repeated until the WSC end instruction is issued.

The WSC end instruction is issued when the vehicle speed reaches the VSP1 at start or when the vehicle 100 is stopped at deceleration to stop. If the WSC end instruction is issued at start, the hydraulic pressure supplied to the second clutch 6 is raised to a hydraulic pressure at which the second clutch 6 is fully engaged, while at deceleration to stop, the hydraulic pressure supplied to the second clutch 6 is made zero so that the second clutch 6 is disengaged.

If it is determined at S3 that the rotation speed of the MG 3 is lower than the stall determination value, the processing proceeds to S9, and the accumulation timer is stopped. That is because, since the rotation speed of the MG 3 becomes less than the idle rotation speed also when the engine 1 stalls, erroneous determination that it is caused by the continuous MAX pressure failure in the second clutch 6, which results in update of the accumulation timer, is to be prevented.

Moreover, if it is determined at S3 that the rotation speed of the MG 3 is not less than the idle rotation speed and if it is determined at S4 that the differential rotation of the second clutch 6 is larger than the engagement determination threshold value, the processing also proceeds to S9, and the accumulation timer is stopped. That is because, drop of the rotation speed of the MG 3 has not occurred yet, and if the second clutch 6 slips, it means that the continuous MAX pressure failure has not occurred in the second clutch 6 and thus, the accumulation timer is also prevented from being updated in such a case.

Subsequently, a working effect of execution of the above-described failure determination processing will be described.

Figure 4A:
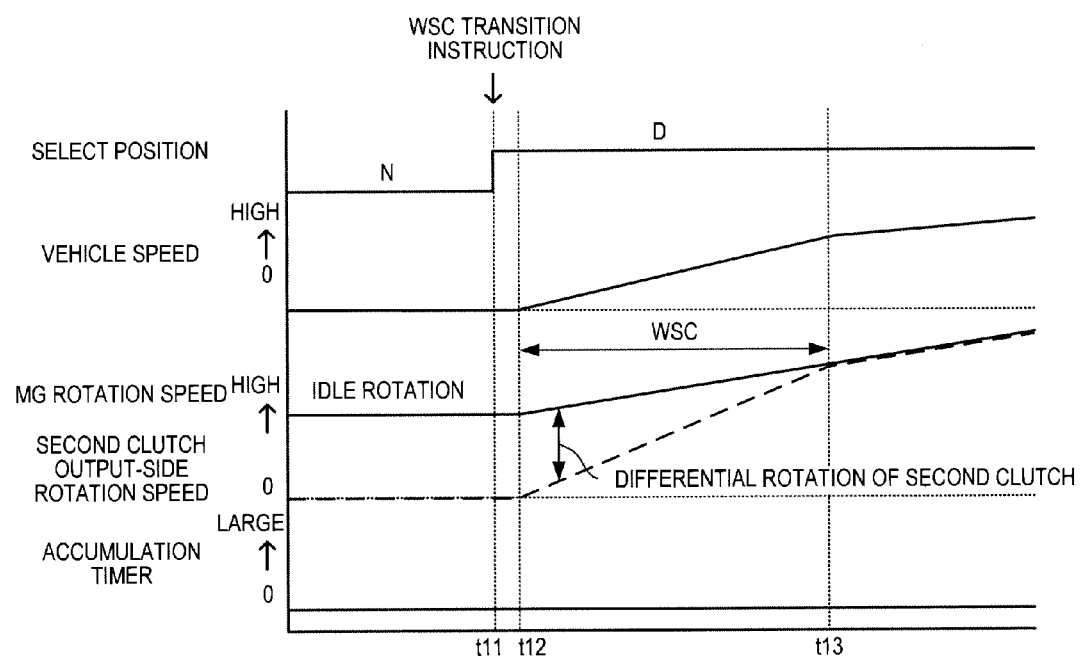
FIG. 4A is a time chart when a continuous MAX pressure failure has not occurred in a second clutch.

FIG. 4A is a time chart illustrating a state in which the above-described failure determination processing is executed when the continuous MAX pressure failure has not occurred in the second clutch 6.

In this example, the WSC transition instruction is issued at time t11, and the state actually enters the WSC state at time t12. Since the continuous MAX pressure failure has not occurred in the second clutch 6, the hydraulic pressure supplied to the second clutch 6 is gradually increased by the WSC control, and the capacity of the second clutch 6 is gradually raised, whereby the second clutch 6 is gradually engaged while being made to slip.

As a result, the differential rotation of the second clutch 6 is gradually reduced, and at time t13 when the vehicle speed reaches the VSP1 and exits from the WSC state, the differential rotation of the second clutch 6 becomes zero, and the second clutch 6 is fully engaged.

During the WSC control, since the rotation speed of the MG 3 does not become less than the idle rotation speed and the differential rotation of the second clutch 6 is larger than 0 at all times in the WSC state, and thus, the accumulation timer is not counted, and it is determined that the continuous MAX pressure failure has not occurred in the second clutch 6.

Figure 4B:
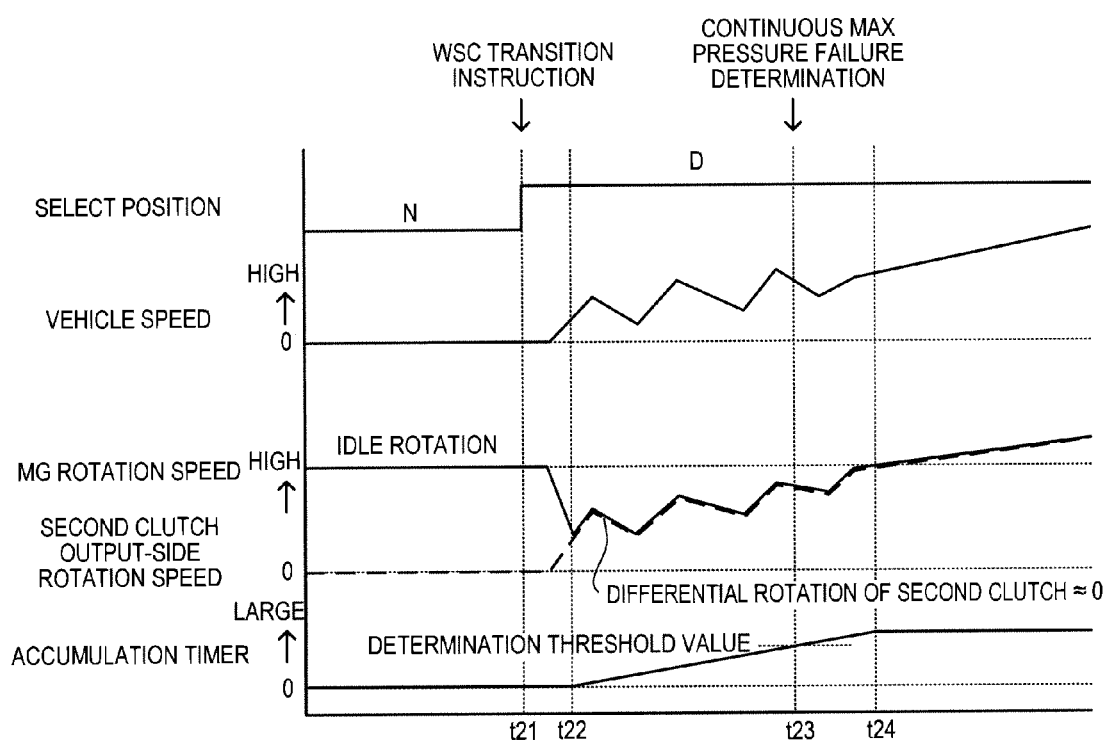
FIG. 4B is a time chart when a continuous MAX pressure failure has occurred in a second clutch.

On the other hand, FIG. 4B is a time chart illustrating a state in which the above-described failure determination processing is executed when the continuous MAX pressure failure occurs in the second clutch 6.

The WSC transition instruction is issued at time t21, but since the continuous MAX pressure failure has occurred in the second clutch 6, the second clutch 6 enters the fully engaged state immediately after delay time has elapsed. As a result, a load is applied to the MG 3 from the driving wheels 8, and the differential rotation of the second clutch 6 becomes substantially zero (time t 22).

At time t22 and after, an operation in which the rotation speed of the MG 3 is lowered, the discharge pressure of the first oil pump 4 falls, and the capacity of the second clutch 6 turns to decrease and an operation in which the second clutch 6 slips upon drop of the capacity of the second clutch 6, the rotation speed of the MG 3 disengaged from the driving wheels 8 rises, the discharge pressure of the first oil pump 4 rises, and the capacity of the second clutch 6 turns to increase are repeated, and the capacity of the second clutch 6 causes hunting. This hunting continues until time t24 when the vehicle speed rises to a vehicle speed corresponding to the rotation speed of the MG 3.

As described above, if the continuous MAX pressure failure has occurred in the second clutch 6, the capacity of the second clutch 6 causes hunting, but according to the above-described failure determination processing, the accumulated value of the time when it is determined that the rotation speed of the MG 3 is less than the idle rotation speed and the differential rotation of the second clutch 6 is less than the engagement determination threshold value is acquired by the accumulation timer. In this embodiment, since the accumulated value exceeds the failure determination threshold value at time t23, it is determined that the continuous MAX pressure failure has occurred in the second clutch 6.

Therefore, according to the above-described failure determination processing, occurrence of the continuous MAX pressure failure in the second clutch 6 can be determined. Moreover, since the failure determination is made at start or deceleration to stop, a chance for the determination failure can be sufficiently ensured.

Moreover, the continuous MAX pressure failure is not determined to have occurred in the second clutch 6 immediately after the rotation speed of the MG 3 becomes less than the idle rotation speed and also the differential rotation of the second clutch 6 becomes less than the engagement determination threshold value but the continuous MAX pressure failure is determined to have occurred in the second clutch 6 when the accumulated value of time in the same state exceeds the failure determination threshold value.

As a result, a noise included in a sensor detected value or a temporary rise of a supply pressure to the second clutch 6 is not erroneously determined to be a failure but occurrence of the continuous MAX pressure failure in the second clutch 6 can be determined with high accuracy.

Moreover, even if time determined to be the above-described state is short at one session of start or deceleration to stop due to driving characteristics of a driver or setting of the WSC control, whether or not the continuous MAX pressure failure has occurred in the second clutch 6 can be determined on the basis of the accumulated value.

Moreover, if the engine 1 has stalled, it is configured that the accumulation timer is not counted. As a result, erroneous determination that the continuous MAX pressure failure occurs in the second clutch 6 if the rotation speed of the MG 3 is less than the idle rotation speed due to the stall of the engine 1 can be prevented.

The embodiment of the present invention has been described above, but the above-described embodiment merely illustrates a part of an application example of the present invention and is not intended to limit the technical range of the present invention to a specific configuration of the above-described embodiment.

The present application claims a priority of Japanese Patent Application No. 2013-62525 filed with the Japan Patent Office on Mar. 25, 2013, all the contents of which are hereby incorporated by reference.

The invention claimed is:

1. A failure determining device of a hybrid vehicle, the hybrid vehicle including an engine and a motor arranged in series, a clutch arranged between the motor and a driving wheel, an oil pump operating by transmission of rotation of the motor, and a pressure control mechanism for controlling a hydraulic pressure supplied to the clutch using a discharge pressure of the oil pump as a source pressure, in which clutch control for controlling the hydraulic pressure supplied to the clutch to a hydraulic pressure at which the clutch is made to slip by the pressure control mechanism at start or deceleration to stop, the failure determining device comprising:
a controller configured to
determine whether or not, regardless of execution of the clutch control, a rotation speed of the motor falls to less than an idle rotation speed and also whether or not differential rotation of the clutch becomes less than a predetermined value; and
determine that, when the determination is positive, a failure has occurred in which the discharge pressure of the oil pump is supplied to the clutch as it is.

2. The failure determining device according to claim 1, wherein
the controller is configured to accumulate time when the positive determination is made and determine that the failure has occurred when an accumulated value of time exceeds a predetermined value.

3. The failure determining device according to claim 2, wherein
the controller is configured to not accumulate the time when the engine stalls.

4. A failure determining method for a hybrid vehicle, the hybrid vehicle including an engine and a motor arranged in series, a clutch arranged between the motor and a driving wheel, an oil pump operating by transmission of rotation of the motor, and a pressure control mechanism for controlling a hydraulic pressure supplied to the clutch using a discharge pressure of the oil pump as a source pressure, in which clutch control for controlling the hydraulic pressure supplied to the clutch to a hydraulic pressure at which the clutch is made to slip by the pressure control mechanism at start or deceleration to stop, the failure determining method comprising:

determining whether or not, regardless of execution of the clutch control, a rotation speed of the motor falls to less than an idle rotation speed and also whether or not differential rotation of the clutch becomes less than a predetermined value are determined; and when the determination is positive, determining that a failure has occurred in which the discharge pressure of the oil pump is supplied to the clutch as it is.

5. A failure determining device of a hybrid vehicle, the hybrid vehicle including an engine and a motor arranged in series, a clutch arranged between the motor and the driving wheel, an oil pump operating by transmission of rotation of the motor, and a pressure control mechanism for controlling a hydraulic pressure supplied to the clutch using a discharge pressure of the oil pump as a source pressure, in which clutch control for controlling the hydraulic pressure supplied to the clutch to a hydraulic pressure at which the clutch is made to slip by the pressure control mechanism at start or deceleration to stop, the failure determining device comprising:

first control means for determining whether or not, regardless of execution of the clutch control, a rotation speed of the motor falls to less than an idle rotation speed and also whether or not differential rotation of the clutch becomes less than a predetermined value; and second control means for determining that, when the determination is positive, a failure has occurred in which the discharge pressure of the oil pump is supplied to the clutch as it is.

\* \* \* \* \*